United States Patent
Mergen

(10) Patent No.: US 8,324,138 B2
(45) Date of Patent: Dec. 4, 2012

(54) ANTI-FRICTION LACQUER

(75) Inventor: Robert Mergen, Altmünster (AT)

(73) Assignee: Miba Gleitlager GmbH (AT)

( * ) Notice: Subject to any disclaimer, the term of this patent is extended or adjusted under 35 U.S.C. 154(b) by 713 days.

(21) Appl. No.: 12/309,943

(22) PCT Filed: Jul. 31, 2007

(86) PCT No.: PCT/AT2007/000371
§ 371 (c)(1),
(2), (4) Date: Aug. 20, 2009

(87) PCT Pub. No.: WO2008/014531
PCT Pub. Date: Feb. 7, 2008

(65) Prior Publication Data
US 2009/0305916 A1  Dec. 10, 2009

(30) Foreign Application Priority Data

Aug. 2, 2006  (AT) ................. A 1301/2006

(51) Int. Cl.
*F16C 33/20* (2006.01)
(52) U.S. Cl. ........................ 508/103; 508/100
(58) Field of Classification Search .......... 508/103, 508/100
See application file for complete search history.

(56) References Cited

U.S. PATENT DOCUMENTS

| | | | |
|---|---|---|---|
| 4,513,988 A | 4/1985 | Svoboda | |
| 4,847,135 A * | 7/1989 | Braus et al. | 428/138 |
| 6,783,869 B2 | 8/2004 | Humer et al. | |

FOREIGN PATENT DOCUMENTS

| | | |
|---|---|---|
| AT | 394681 B | 11/1983 |
| DE | 1817018 A1 | 7/1969 |
| DE | 3727591 A1 | 3/1989 |
| DE | 283853 A5 | 10/1990 |
| DE | 10249051 A1 | 5/2003 |
| EP | 0024291 A2 | 3/1981 |
| EP | 0356287 A1 | 2/1990 |
| EP | 1522750 A1 | 4/2005 |
| EP | 1775030 A1 | 4/2007 |
| GB | 1260492 A | 1/1972 |
| JP | 04164965 A * | 6/1992 |
| JP | 4164965 A | 6/1992 |
| WO | 02070617 A1 | 9/2002 |

OTHER PUBLICATIONS

Sharma, R.C. and Chang, Y.A., Journal of Phase Equilibria, vol. 17 No. 3, 1996, p. 261-266.*
International Search Report, PCT/AT2007/000371, dated Oct. 22, 2007.

* cited by examiner

*Primary Examiner* — Jim Goloboy
(74) *Attorney, Agent, or Firm* — Lerner, David, Littenberg, Krumholz & Mentlik, LLP

(57) ABSTRACT

The invention documents an anti-friction lacquer containing at least one additive (5) that has a polymer matrix distributed within. Additive (5) is subject to change in temperature conditions in a temperature region with an upper threshold of 600° C. for a particular irreversible energy consuming conversion, such as phase change or modification change.

20 Claims, 2 Drawing Sheets

ANTI-FRICTION LACQUER

Figure 1:
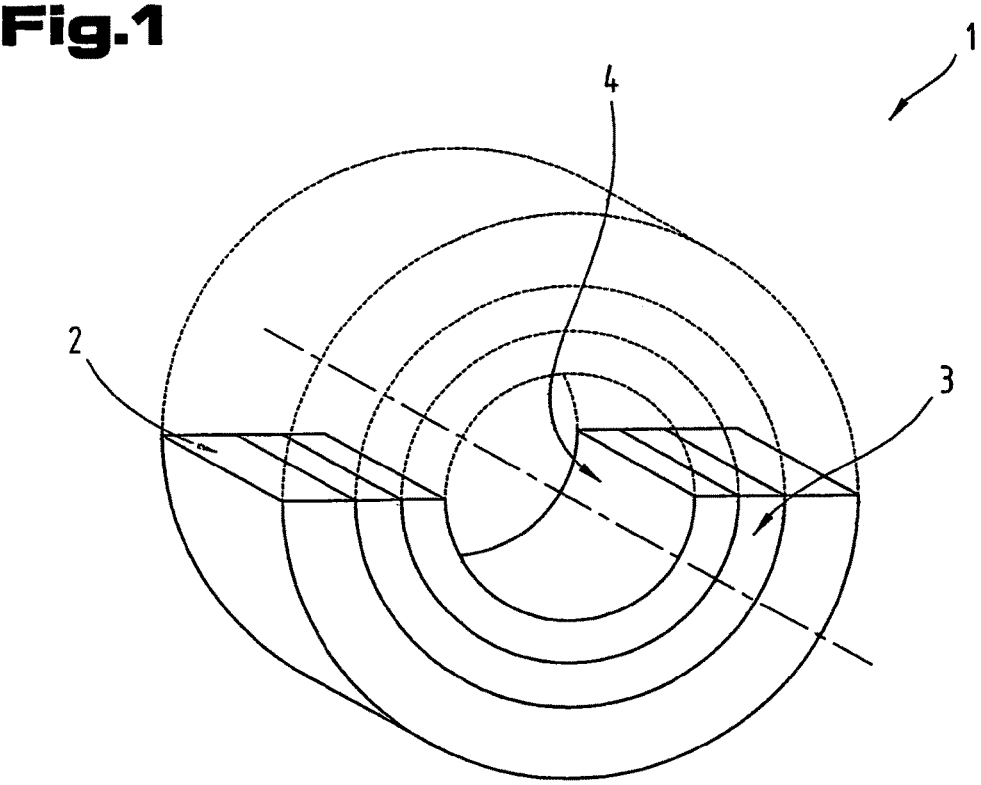

The invention describes an anti-friction lacquer having a polymer matrix, wherein at least one additive is distributed, an anti-friction coating used for a bearing element, a method employed in order to protect the anti-friction coating of a bearing element—in particular of an engine bearing—against overheating, as with the use of a metal additive in an anti-friction coating.

State of the art anti-friction lacquers are designed to provide an anti-friction coating amongst others, to be more precise to provide an engine bearing. These kinds of anti-friction coatings are subject to increased temperature stress due to temperature changes in the engine, amongst others, resulting from the lubricating oil, where applicable. In theory, local temperatures in certain circumstances can rise to 1000° C. and higher. Such acute heat are avoided as it can lead to local overheating of the anti-friction coating and resulting damage to or thinning of the oil film, and the worst case scenario would involve failure of the bearing element.

In order to avoid overheating of this kind, DD 283 853 A5 is advised by way of example—an anti-friction coating made from polyamide, polyetheretherketone or polytetrafluoroethylene to be mixed with silicon carbide particles, in order to improve the heat conductivity of the anti-friction coating. Thus, it will be made possible to deflect the emerging heat from the surface of the anti-friction lacquer to the underlying metal coating.

For this purpose, metal particles made from bronze are advised as they show similar modes of action.

The task of the current invention is to improve temperatures relations of an anti-friction lacquer, at least approximately, without leading to degradation of tribological characteristics.

This task will be solved separately from the issue that the anti-friction lacquer additive (according to the present invention) is a material that due to temperature change in a temperature region with the highest threshold reaching up to 600° C., or 500° C. more specifically, is subject to a reversible energy consuming change, resulting from the anti-friction coating (of the present invention) that is fabricated from this anti-friction lacquer, and through methods of bearing elements' anti-friction protection, in which the addition of this matrix additive is significant.

The energy consuming change of the additive can, for example be a phase change, or a modification change. It is not intended with this to divert the emerging heat, i.e. energy to underlying coating of a bearing element, this energy will be used and saved within the coating through heat conversion. It is therefore particularly advantageous if conversion is reversible so that the energy can be returned to its original form, that the energy contained can be newly emitted in order for the entire cycle to be made possible once again, from start to finish. With a steady emission of the accumulated energy, abrupt temperature changes of the anti-friction lacquer can be achieved, resulting in the matrix being preserved. Thermal fatigue can therefore be avoided over long periods of time. Furthermore, it can also have a positive influence on the anti-friction lacquer general temperature behaviour over a long period of time. Stemming from this, it is possible to reduce the filling degree of the anti-friction lacquer with such an additive and to reduce anti-friction lacquer manufacturing costs.

Although the higher threshold of the temperature region ought usually to be within those of the conversion—below 600° C., it is possible, without exceeding the framework of the investigation, to shift the higher temperature threshold, as long as it is required in order to have increase effectiveness to the anti-friction lacquer, and the bearing element—as a result of temperature ratios. It is therefore also possible to extend this upper threshold to 700° C. With an upper threshold of 600° C., or more precisely 500° C., the additive can reach conversion earlier so that safety of the bearing element can be increased.

A further possibility is for the upper threshold to move to lower temperatures for the conversion if the expected temperatures for the bearing element are lower than mentioned above for any particular reason.

It is preferable that at least one additive from the group of metals or metal alloys is selected. This is particularly important given that metals, and metal alloys respectively, intended for the purpose of anti-friction lacquer on bearing elements, can also assume tribological functions as these are desirable for the bearing elements.

Metals that are suitable are those with a melting point or a modification change that lies below the matrix decomposition threshold. Indeed, in the framework of this investigation, alloys will that are favoured are those with a wider conversion spectrum. They can be binary, ternary, quaternary alloys or phase systems. The advantage that this brings is that when an alloy is selected automatically, whereby there is a clear space between the solidus curve and the liquidus curve, so the that a high percentage of liquid phase is available and more energy can be converted with the same percentage of additive.

The alloy can be selected from the eutectic or peritectic system. It can have the very same eutectic or peritectic composition, or can in the same way can possess characteristics of the hypereutectic or hyperperitectic composition. On the one hand, the additive achieves a certain fineness of grain which in turn means that it can be mixed into the polymer matrix of the anti-friction lacquer relatively easily, and with high constancy. On the other hand, there is a particular advantage—the eutectic point is a well-known method for establishing an exact fusion point, without a melting range, so that temperature behaviour of the anti-friction lacquer can be established in a very precise manner. There is a further advantage to this method which can be applied with metals that have a melting point higher than 600° C. whereby the spectrum of the particular material, including metals, cannot be extended, even marginally. On one hand, with the help of the high solidification range for eutectic systems, a definite critical point can be established, and on the other hand a wider range of efficiency can be established if required.

The type of metal can be selected from a group containing the following metals: bismuth, lithium, cadmium, gallium, indium, lead, tellurium, tin and zinc, and possibly a mixture of these. An advantage with the use of these metals is that with heat destruction, the elements can also have a positive effect on structural performance, and on the tribology of the anti-friction lacquer respectively.

Alloys can again be selected from a group containing nickel-based alloys: gallium, indium, cadmium, stibium, zinc, aluminium, magnesium, copper, silver, bismuth, tin or lead, or a mixture of these. An advantage of using these materials is that the alloys demonstrate a wider conversion spectrum. In addition to this, the tribological efficiency of these alloys can be used, at least in part, for example with aluminium/silicon alloys.

Salts, as well as salt blends, such as oxide or nitride for example, can also be inserted as additives. Here, there is also the possibility of using eutectic salts, and salt blends so as to insert the salts that possess a higher melting point, as well as a higher conversion temperature.

As mentioned earlier, it is advantageous if one of the different additive variants is in powder form in order to achieve at least a near homogeneous distribution of the additive in the anti-friction lacquer.

The particles of the additive can have a grain size whereby 95% of each particle has a value of at least 0.1% and at the very most 5% of each particle has maximal value of 95% of the thickness of the anti-friction coating. By average grain size, in the realms of this invention, it is meant that untrue, as well as elongated particles with the smallest dimensions, not longitudinal measurements are to be considered.

Under the lowest threshold of grain size, it is not possible to gain sufficient efficiency for energy consuming conversion, an agglomerating formation can be observed. Moreover, these particle sizes are more expensive when it comes to manufacturing. In the upper region of the upper threshold, under certain circumstances problems can arise in relation to matrix adhesiveness, it could also be the case that a single grain of the additive from the surface area of the upper boundary is protruding and where possible could be ripped out of the matrix. Beyond that, it is possible for the upper part of the upper threshold to undergo difficulties under certain circumstances so far as anti-friction lacquer processing goes. This could occur through spraying or treating, and the surface appearance of the anti-friction lacquer can be damaged as a result.

It is important to mention at this point that it is definitely worthwhile occasionally to push the single grain out of the anti-friction lacquer matrix, particularly if the additive has additional tribological characteristics that are valuable so far as the physical constitution of the bearing element is concerned.

As well as the powder form and grain constituency of the additive there is another appropriate type of variant that is designed to form a flaky or elongated, stalky habitus. Here, a stalky habitus is of particular advantage if the lamellæ reach to at least at near parallels to each surface area, on which a pivoting element, a shaft for instance, will be supported so that additional bilateral sliding of the lamellæ onto on another is made possible, which leads to sliding characteristics of the anti-friction lacquer being further improved.

With an elongated, stalky composition of the additive, it is possible to benefit from the advantage that they occasionally protrude through the anti-friction lacquer coating thickness so that as well as energy consuming conversion, it is possible for heat to be conducted through to the underlying coating, as is now a state of the art procedure, which consequently leads to improved temperature behaviour of the anti-friction lacquer being achieved.

The proportions that an additive must be contingent with can be selected from a range with a lower threshold of 2% by weight, notably 8% by weight, 15% by weight, and an upper threshold of 75% by weight, notably 60% by weight and 45% by weight in accordance with the dry weight of the anti-friction lacquer. Dry weight signifies the weight excluding the solvent. Below the lower threshold, it is not possible to establish sufficient efficiency of the additive. One part more than is shown in the upper threshold, however shows no additional effect, if it is based solely on the energy consuming conversion.

It can occasionally however be advantageous if the aforementioned tribological base of the additive is available in a higher proportion than is set out by the upper threshold limitations.

As a further development to anti-friction lacquers, it is to be envisaged that the concentration of at least one additive from one the first surface layers rises in the same direction over the second surface layer. This will allow for a concentration gradient to become developed on the coating thickness of the anti-friction coating. As a result it will be possible, at least in particular regions where the temperature is established, to provide a higher proportion of additive to regions such as surface area regions, where the anti-friction coating that lies near the pivoting element, to be more precise. It will also be possible for areas where temperature stress is restricted to a lessened degree to provide proportions of additive that are clearly reduced. Furthermore, it is possible that due to this very reason, in regions with reduced temperature stress where the proportion of additive is reduced, an improved adhesive strength of the anti-friction lacquer to another material, a coating such as an metal bearing coating can be achieved.

The concentration gradient can be stepped or can have a continuous increase whereby it can develop further to form a linear curve, otherwise it can be in the form of a curve with a more or less severe increase in comparison to a linear evolution.

According to the bearing element invention, at least one additional coating can be applied between the anti-friction coating and the rest bar, more specifically—as already mentioned—a metal bearing coating, an adhesive layer coating, a diffusion boundary later, in order to improve tribological behaviour or the adhesive strength of at least one individual coating against another, and to avoid the diffusion of elements of individual coatings amongst other coatings.

Furthermore, the invention applies the use of a metallic additive that experiences a phase change or modification change in a temperature range up to 500° C., as an addition to a anti-friction matrix as protection against overheating. A purpose such as this is therefore not limited solely to anti-friction lacquers, it can also be aimed more generally for the purpose of anti-friction coatings so that as well as being conventional and state of the art, it encompasses metallic anti-friction coatings in the protection area. This type of metallic coatings are usually made from alloys, in which soft phases and also hard phases are incorporated. Up until now, even state of the art discoveries have not proven that these types of metallic coatings require the addition of at least one additive in order for it to bring about energy degradation i.e. heat loss due to conversion of the additive, whether due to phase change or modification change. This, in fact, was not essential up until now given that metallic coatings possessed adequate conductivity, which meant that heat affecting the surface area of the anti-friction coating was drawn to the underlying coating. Following on from this, it is now possible with the invention for the temperature behaviour of these types of metallic anti-friction coatings to be improved through a lengthening of bearing element lifespan. This is the case instead of thinning of the oil film taking place given that the group of components on which the bearing element is installed has a longer lifespan.

As a further development to use, it is envisaged that the additive is not mixable with the matrix. The additive is therefore discretely existent in the metallic matrix. As a consequence of this, the energy consuming conversion can, for instance, incorporate a transition into a molten, plastic condition so that resistance of the anti-friction coating is guaranteed thanks to the additive encompassed matrix, as well as further additives, such as resin particles etc. The additive inside the matrix is therefore regulated and there is not the danger that the additive hot-dip coatings are ripped out of the matrix. From anti-friction coating cooling, the additive solidifies once more and is available almost completely unchanged inside the anti-friction coating.

In order to gain a fuller comprehension of the invention, the following figures are exemplified by means of example:

(Each show a schematic and simplified representation.)

Figure 2:
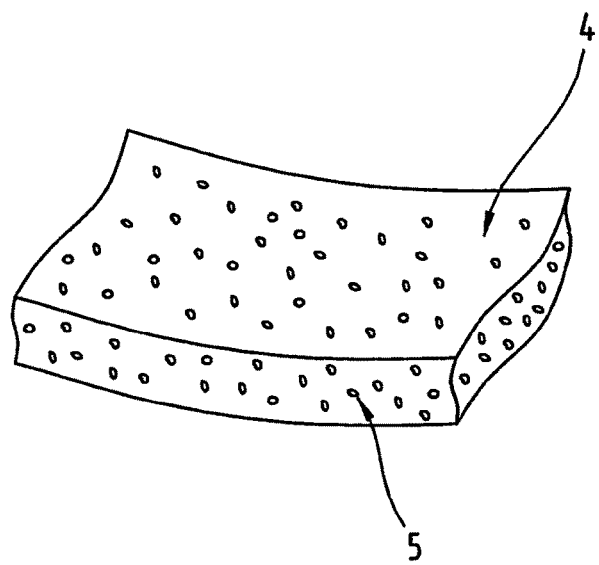
Figure 3:
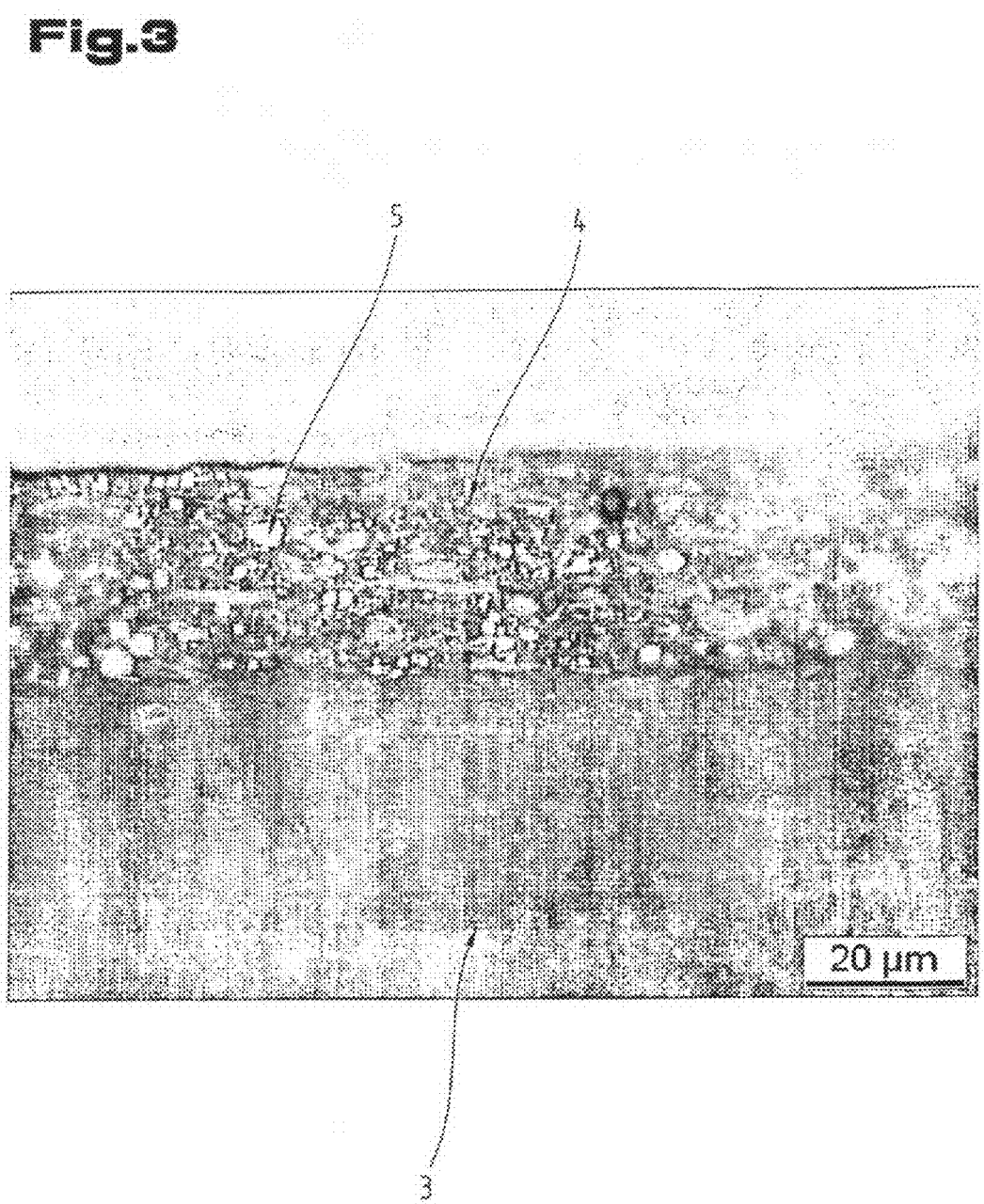

FIG. 1 the different variants of bearing elements according to the invention in the form of an engine bearing half shell;

FIG. 2 a section of one of the anti-friction coatings pertaining to the invention;

FIG. 3 a cross-section of one of the anti-friction coatings with embedded tin particles pertaining to the invention.

First of all, it was recorded that in the various previously described forms, the same parts were used with the same reference marks, as well as the same component labelling. This allows the complete description containing specific details to refer in a coherent manner to the same components having the same reference marks, and the same component labelling. Another element that is vital in the labelling is that details of location, such as above, below, on the side of, etc. refer directly to the representations given in the various diagrams, so that if there is a change of position these can be located and the components transferred easily to the new location. Furthermore, individual features or combination of features from the given descriptions in the examples ought to provide self-contained, resourceful solutions, at least as far as the invention is concerned.

FIG. 1 shows bearing (1) in the form of an engine bearing half shell. This consists of a rest bar (2), a metal bearing coating (3) placed on (2), and an anti-friction coating (4) situated on (3).

The invention, however is not limited to these bearing elements in the form of three bearing element coatings. The invention encompasses a great deal more—bearing element (1) in the form of a bearing sleeve, as shown by the dashed line in FIG. 1; bearings of a cylinder form—in the form of a surface coating; etc. Generally, for bearing element (1), further elements such as shafts that can be moved or pivoted to be more precise (against bearing element (1) are supported.

What is more, it is not absolutely necessary that under the terms of the invention, the bearing element has three coatings. This so called two-coating bearing element, containing a rest bar (2) and an anti-friction coating (4) can have a lot more—areas subject to tribological stress can be directly coated on anti-friction coating (4). Alongside the three coatings that have already been mentioned, there can also be additional interface coatings, such as an adhesive layer coating between the rest bar (2) and the metal bearing coating (3) and/or between the metal bearing coating (3) and the anti-friction coating (4), as well as between rest bar (2) and the anti-friction coating (4). In the same way, a so-called diffusion boundary layer can be inserted between all layers in order to avoid diffusion of individual components from coatings into other layers.

As a rest bar, strips or half shells of steel or suchlike can be used, as they are well-known by experts to be suitable for this purpose.

The following alloys can, by means of example, be used for metal bearing element (3):

Bearing Metals with an Aluminium Base (In Part in Accordance with DIN ISO 4381 and 4383):
AlSn6CuNi, AlZn5SiCuPBMg, AlSi4Cd, AlCd3CuNi, AlSi11Cu, AlSn6Cu, AlSn40, AlSn25CuMn, AlSi11CuMgNi, AlZn4SiPb;

Bearing Elements with a Copper Base (In Part in Accordance with DIN ISO 4383):
CuPb10Sn10, CuSn10, CuPb15Sn7, CuPb20Sn4, CuPb22Sn2, CuPb24Sn4, CuPb24Sn, CuSn8P, CuPb5Sn5Zn, CuSn7Pb7Zn3, CuPb10Sn10, CuPb30;

Bearing Elements with a Lead Base:
PbSb10Sn6, PbSb15Sn10, PbSb15SnAs, PbSb14Sn9CuAs, PbSn10Cu2, PbSn18Cu2, PbSn10TiO2, PbSn9Cd, PbSn10;

Bearing Elements with a Tin Base:
SnSb8Cu4, SnSb12Cu6Pb.

It goes without saying that bearing metals other than those mentioned can be used for those with an aluminium, copper, lead, tin base.

It is preferable however to use lead-free bearing metals.

For adhesive layer coatings, coatings made from aluminium or aluminium alloys can be used, for example, and so can $AlSc_3$, etc.

For diffusion boundary layers aluminium and aluminium alloy coatings or nickel coatings etc. can also be used.

Anti-friction coating (4) can be an alloy or can be introduced through an anti-friction coating.

For the anti-friction coating, polymers can be selected from the following group, for example: polytetrafluorethylene, resin containing fluorine, such as perfluoroalkoxy copolymer for example, polyfluoroalkoxy polytetrafluorethylene copolymer, ethylene tetrafluoroethylene, polychlorotrifluoroethylene, fluorinated ethylene propylene copolymer, polyvinyl fluoride, polyvinylidene fluoride, alternating copolymer, statistical copolymers such as perfluoroethylenepropylene, polyesterimide, bismaleimide for example, polyimide resin, such as carboranimide, aromatic polyimide resin, polyimide resin free of water substances, polytriazolepyromellithimide, polyamide-imide, particularly the aromatic type, poly(aryl ether imide), also modified with isocyanate, polyetherimide, also modified with isocyanate, epoxy resin, epoxy resin ester, phenolic resin, polyamide 6, polyamide 66, polyoxymethylene, silicon, polyaryl ether, polyaryl ketone, polyaryl ether ketone, polyaryl ether etherketone, polether etherketone, polyether ketone, polyvinylidene diflouride, polyethylene sulphide, propine suphide, polytriazole pyromellithimide, polyesterimide, polyaryl sulphide, polyvinyl sulphide, polyphenylene sulphide, polysulphone, polyether sulphone, polyaryl sulphone, polypropine oxide, polyaryl sulphide, nitrile rubber, fluor rubber, mixtures and copolymers thereof. The proportions of polymers in the anti-friction lacquer can be selected from a region with lower threshold at 25% by weight and an upper threshold of 98% by weight, from the lowest threshold of 50% by weight and the highest threshold of 85% by weight, as from a region with lower threshold at 70% by weight and a higher threshold of 75% by weight.

For the anti-friction lacquer, the polymer can contain various different auxiliary products, selected from a group comprised of anti-friction substances such as $MoS_2$, h-BN, $WS_2$, graphite, polytetrafluoroethylene, Pb, Pb—Sn alloys, $CF_2$, $PbF_2$, hardening materials, such as $CrO_3$, $Fe_3O_4$, PbO, ZnO, CdO, $Al_2O_3$, SiC, $Si_3N_4$, $SiO_2$, $Si_3N_4$, clay, talk, $TiO_2$, mullite, $CaC_2$, Zn, AlN, $Fe_3P$, $Fe_2B$, $Ni_2B$, FeB, metal sulphide, such as ZnS, $Ag_2S$, CuS, FeS, $FeS_2$, $Sb_2S_3$, PbS, $Bi_2S_3$, CdS, fibre, inorganic in particular such as glass, carbon, potassium titanate, whisker, SiC, for example, metal fibre, made from Cu or steel for example, as well as mixtures of these, in order to improve anti-friction behaviour.

As a solvent for the anti-friction lacquer, all are considered as state of the art solvents, particularly those that are inorganic—xylol is used as an example.

It is advantageous if an anti-friction coating is used that incorporates a polyimide as a polymer matrix—a polyamidimide to be more exact, or a molybdenum disulphide, with graphite as a solid lubricant. The percentage of the polyimide in the anti-friction lacquer can be selected from a region with a lower threshold of 20% and an upper threshold of 80%, the percentage of molybdenum disulphide from a region with a lower threshold of 15% and a lower threshold of 50%. The percentage of graphite will be selected from a region with a lower threshold of 5% and an upper threshold of 30%.

The percentage of polyimide can also be selected from a region with a lower threshold of 30% and an upper threshold of 70% respectively, with a lower threshold of 40% and an upper threshold of 50% respectively. The percentage of molybdenum disulphide can be selected from a region with a lower threshold of 20% and an upper threshold of 45% respectively with a lower threshold of 35% and an upper threshold of 40%. The percentage of graphite can be selected from a region with a lower threshold of 10% and an upper threshold of 25% or from a region with a lower threshold of 15% and an upper threshold of 20%.

The proportion of molybdenum disulphide to graphite can be selected from a region with a lower threshold of 1.5:1 and a higher threshold of 4.5:1. The self-lubricating behaviour of the anti-friction coating can therefore be altered so that taking the relevant proportion of molybdenum disulphide to graphite into consideration, i.e. the variation of the proportional relation of this additive to polymide, at least one of the properties of the anti-friction coating can once again be adjusted to each respective use.

The molybdenum disulphide is primarily contained in the anti-friction lacquer in the form of platelets, whereby the platelets of average length, and are selected from a region with a lower threshold that measures 10 µm and a higher threshold that measures 40 µm and/or an average width, selected from a region with a lower threshold that measures 10 µm and a higher threshold that measures 40 µm and/or an average height, selected from a region with a lower threshold that measures 2 nm and a higher threshold that measures 20 nm. Therefore, clear directionality of the self-lubricating characteristics can be achieved, whereby the molybdenum disulphide platelets are preferably arranged parallel to the anti-friction lacquer coated surface so that the platelets can be pushed against one another under pressure. As a consequence, the sliding properties of the anti-friction lacquer are improved.

In order to further improve these characteristics and for them to remain optimum, it is possible for the molybdenum disulphide platelets to possess an average length, selected from a region with a lower threshold of 15 µm, and an upper threshold of 35 µm and/or an average width selected from a region with a lower threshold of 15 µm and an upper threshold of 35 µm. The average height (dependant also on the width) will be selected from a region with a lower threshold of 5 nm and an upper threshold of 15 nm, respectively. Depending on the platelets, the average length will be selected from a region with a lower threshold of 18 µm and an upper threshold of 25 µm and/or an average width selected from a region with a lower threshold of 18 µm and an upper threshold of 25 µm an/or an average height, selected from a region with a lower threshold of 5 nm and an upper threshold of 8 nm.

It appears to become evident that the platelets do not necessarily need to have a square surface, it is a lot more likely that the platelets will have an irregular habitus so that medial values of length, height, width, etc. also have individual values that lie outside the given area.

The individual mean values can however lie within the regions mentioned.

Graphite ought preferably to be presumed to have a grain size that falls within a region with an lower threshold of 2 µm and an upper threshold of 8 µm.

The anti-friction lacquer works as a paste against friction. The anti-friction lacquer can be treated as a paste to counteract friction, given the high proportion of solvent.

The anti-friction paste can have at least nearly the same constituency as above. The anti-friction dispersion can have proportions of polymide selected from a region with the lower threshold of 20% and a higher threshold of 40%, the proportion of molybdenum disulphide selected from a region with a lower threshold of 15% and an upper threshold of 25%, the proportion of graphite will be selected from a region with a lower threshold of 5% and an upper threshold of 15%, whereby the remaining substance creates a dispersant.

Furthermore, the anti-friction lacquer can be developed as a state of the art product, also containing additive that improve its plasticity.

According to the present invention, it is now intended that anti-friction lacquer (anti-friction coating (4)) contains at least one additive (5) that is to be distributed within as shown in FIG. 2.

The additive in this invention is a material that has temperature region reaching to an upper threshold of 600° C., notably 500° C., and that undergoes temperature dependant conversion. The conversion can on one hand be a phase change, where by example the additive that is contained changes in part or in full from a solid to a liquid state. On the other hand, the phase change can also be a modification change. As a result of this conversion, energy is spent leading to the surface of the anti-friction coating (4) being protected by the impact of heat from this conversion process. The anti-friction coating (4) is therefore protected against overheating.

This phases, as well as the modification transitions are therefore linked to the so-called conversion enthalpy. Conversion enthalpy can be understood to be a collective name for heat conversion that is consumed or released through the transition. According to the invention, energy is therefore consumed to cool the anti-friction coating (4) and to avoid a further temperature rise. It is however possible and also preferable for the energy that is consumed as a result of cooling of the bearing elements (1), as well as of the anti-friction coating (and the anti-friction lacquer)—due to temperature conversion—be released once again. This means then that the conversion is reversible whereby anti-friction coating (4) reaches cooling in a way that is known to us, and that large temperature fluctuations can be absorbed. This consequently reduces the danger of premature temperature stress.

With regard to the existence of several modifications of an element, the term allotropy exists—this relates to the terms dimorphism and trimorphism and polymorphism. Such modifications differentiate by way of a crystal lattice and their stability shows, for the main part, other pressure and temperature functions. So-called enantiotropic modifications that can be trans-formed in a reversible manner are favoured here. For the purposes of the invention, other monotropic modifications, irreversible modifications can be used as long as a sufficient quantity is employed within the anti-friction lacquer.

As is appearing evident from what has already been mentioned, metals and their alloys are preferred as additives (5) for this invention. As has already been clarified above, salts as well as salt mixtures, eutectic substances in particular, can be inserted. This does not mean, however that additives other than metal additives, those that have an energy-consuming conversion in the temperature regions given, cannot be inserted—ceramics and resistant materials etc. can also be used.

Possible alloys for additives (5) are given in the following table, Table 1

| | | | | | Alloy formation [%] | | | | | | | |
|---|---|---|---|---|---|---|---|---|---|---|---|---|
| No | Ga | In | Sn | Bi | Pb | Cd | Sb | Zn | Al | Cu | Ag | Si |
| 1 | 62.50 | 21.50 | 16.00 | | | | | | | | | |
| 2 | | 19.10 | 8.30 | 44.70 | 22.60 | 5.30 | | | | | | |
| 3 | | 21.00 | 12.00 | 49.00 | 18.00 | | | | | | | |
| 4 | | | 13.10 | 49.50 | 27.30 | 10.10 | | | | | | |
| 5 | | | 12.00 | 50.00 | 25.00 | 12.50 | | | | | | |
| 6 | | 26.00 | 17.00 | 57.00 | | | | | | | | |
| 7 | | 44.00 | 42.00 | | | 14.00 | | | | | | |
| 8 | | | 15.50 | 52.50 | 32.00 | | | | | | | |
| 9 | | | 34.00 | 46.00 | 20.00 | | | | | | | |
| 10 | | 52.20 | 46.00 | | | | | 1.80 | | | | |
| 11 | | 52.00 | 48.00 | | | | | | | | | |
| 12 | | | | 55.50 | 44.50 | | | | | | | |
| 13 | | | 42.75 | 54.54 | | | | 2.71 | | | | |
| 14 | | | 43.47 | 55.85 | | | | | | | 0.68 | |
| 15 | | | 42.00 | 58.00 | | | | | | | | |
| 16 | | 97.00 | | | | | | | | | 3.00 | |
| 17 | | | 50.00 | | 32.00 | 18.00 | | | | | | |
| 18 | | | 48.00 | | 50.00 | | 2.00 | | | | | |
| 19 | | | 91.00 | | | | | 9.00 | | | | |
| 20 | | | 91.80 | 4.80 | | | | | | | 3.40 | |
| 21 | | | 95.50 | | | | | | | 0.70 | 3.80 | |
| 22 | | | 96.50 | | | | | | | | 3.50 | |
| 23 | | | 99.25 | | | | | | | 0.75 | | |
| 24 | | | 10.00 | | 90.00 | | | | | | | |
| 25 | | | | 97.50 | | | | | | | 2.50 | |
| 26 | | | | 95.25 | | | 5.75 | | | | | |
| 27 | | | | 97.73 | | | | | | | 2.27 | |
| 28 | | | | | | | | | 65 | 35 | | |
| 29 | | | | | | | | | 88.30 | | | 11.7 |

Example 23 shows an allotrope conversion in a stable condition with a eutectic constitution (conversion of intermetallic phase at 187.5° C., Cu6Sn5 following Cu6Sn5').

Preferably, additive (5) particles can exist within the matrix discretely.

So as to enable use of metals with high conversion temperatures, eutectic systems can be used. They can either possess the exact eutectic constitution or constitutions that deviate from the eutectic but that also show at least a partially similar conversion.

In the realms of the invention, in this context eutectic compositions have been used and tested up until now that are taken from systems Al—Ca, Al—Cu, Al—Si, Mg—Ni, Mg—Sb, Mg—Si and Cu—Sb.

This explains one of the preferred variants for the invention—bearing element (1), notably a bearing element half shell. It is advantageous when additive (5) possesses further characteristics that work tribologically. This enables the additive (5) to be relatively strong so that anti-friction coating (4) has a certain embeddability to impart foreign particles that come about from abrasion. On the other hand, it is possible that this additive is hard so as to enable a certain compatibility in running-in characteristics for the anti-friction coating.

Mixtures of various additives (5) are also possible here so that several of the tribological characteristics are united in one coating, the coating can also contain additives (5) that are relatively soft, or it can contain additives that have a high diamond pyramid hardness number.

In FIG. 3, a cross-section is represented with an anti-friction coating according to the invention. It is directly applied to metal bearing coating (3) with an aluminium basis. Additive (5) is clearly visible in the anti-friction coating (4), that are formed by tin particles, that have an almost globular habitus. The anti-friction lacquer of the anti-friction coating contains 20% tin particles.

The anti-friction lacquer can be worked in such a way, such as by spray coating, coating, screening, offset printing etc. Directly coating bearing elements (1) can therefore be manufactured.

With reference to the manufacturing of the bearing element, an expert can only refer back to the literature. As an example, a band of steel can be used as rest bar (2) by rolling or galvanisation or by deposition of PD methods, e.g. sputtering with metal bearing coating (3). Anti-friction coating (4) can be applied to the latter (notably the anti-friction lacquer used in this invention). In the case where anti-friction coating (4) is developed as an alloy, it can be applied using the method mentioned.

It goes without saying that intermittent steps in the form of heat treatment are possible and that they can be further researched by the expert using the respective literature.

All specifications to values (within specific regions) in the previous descriptions are to be understood to preferable, e.g. statements 1-10 are to be understood as preferable methods using the lower threshold 1 and higher threshold 10, meaning that all sub-ranges start with a lower threshold of 1 or higher and finish with an upper threshold of 10 or less, e.g. 1-1.7 or 3.2-8.1 or 5.5-10.

The examples given show possible variants of the anti-friction lacquer in bearing element (1) where we ought to mention that the invention is not limited to the variants themselves—endless combinations of the individual variants that have been described and documented are possible. The possibility to include such variations stems from extensive reading and consideration of the technical behaviour, through opposing inventions to gain knowledge within this technical area of research, that is now made available to the technical expert. Any variations that one can think of are possible and the individual details of the represented and described variants are given, and the extent of protection levels necessary has been taken into account.

As a matter of form, so as to fully comprehend the layout of bearing element (1) and the various components, the images have been reduced and enlarged.

The independent, innovative solutions can be extracted from the description thanks to a horizontal representation.

KEY OF RELEVANT FIGURES

1 Bearing element
2 Rest bar
3 Metal bearing coating
4 Anti-friction coating
5 Additive

The invention claimed is:

1. A bearing element comprising a supporting element and an anti-friction coating disposed on top of the element, the anti-friction coating is formed from an anti-friction varnish comprising a polymer matrix and at least one additive, the at least one additive, is dispersed in the polymer matrix, and the at least one additive is subject to an energy consuming conversion with increasing temperature in a temperature range up to an upper limit of 600° C., wherein the at least one additive is selected from the group consisting of metals, alloys, salts, and mixtures thereof, and wherein the alloy, the salt, or the salt mixture is a eutectic alloy, salt, or salt mixture or is selected from an eutectic system or that the alloy is a peritectic alloy or is selected from a peritectic system.

2. The bearing element as claimed in claim 1, wherein the metal is selected from a group consisting of bismuth, lithium, cadmium, indium, lead, tellerium, tin, zinc and mixtures thereof.

3. The bearing element as claimed in claim 1, wherein the alloy is selected from a group consisting of base alloys containing gallium, indium, cadmium, antimony, zinc, aluminium, magnesium, copper, silver, bismuth, tin, lead, and mixtures thereof.

4. The bearing element as claimed in claim 1 wherein the at least one additive is a powder.

5. The bearing element as claimed in claim 1, wherein the anti-friction varnish has a coating thickness and the additive has an average grain size at which 95% of the particles has a value of at least 0.1% and at maximum 5% of the particles has a value of at maximum 95% of the anti-friction varnish coating thickness.

6. The bearing element as claimed in claim 1, wherein the at least one additive has a flaky, elongated or stalky habitus.

7. The bearing element as claimed in claim 1, wherein the amount of the at least one additive is selected from a region with a lower limit of 2% by weight and an upper limit of 75% by weight relating to the dry weight of the anti-friction lacquer.

8. The bearing element as claimed in claim 1, wherein anti-friction coating has a first and second surface and the concentration of the at least one additive increases from the first surface in the direction towards the second surface.

9. The bearing element as claimed in claim 1, wherein between the anti-friction coating and the supporting element at least one further layer is arranged.

10. A method for the protection of an anti-friction coating of a bearing element against overheating, whereby the anti-friction coating is formed from an anti-friction varnish comprising a polymer matrix and at least one additive, the at least one additive is dispersed in the polymer matrix, and the at least one additive is subject to an energy consuming conversion with increasing temperature in a temperature range up to an upper limit of 600° C. wherein the at least one additive is selected from the group consisting of metals, alloys, salts, and mixtures thereof, and wherein the alloy, the salt, or the salt mixture is a eutectic alloy, salt, or salt mixture or is selected from a eutectic system or that the alloy is a peritectic alloy or is selected from a peritectic system.

11. The bearing element as claimed in claim 1, wherein the at least one additive is immiscible with the matrix.

12. The bearing element as claimed in claim 1, wherein energy consuming conversion is reversible.

13. The bearing element as claimed in claim 9 wherein the at least one further layer is a bearing metal layer and/or an adhesive layer and/or a diffusion barrier layer.

14. A bearing element comprising a supporting element and an anti-friction coating disposed on top of the element, the anti-friction coating is formed from an anti-friction varnish comprising a polymer matrix and at least one additive, the at least one additive is dispersed in the polymer matrix, and the at least one additive is subject to an energy consuming conversion with increasing temperature in a temperature range up to an upper limit of 600° C., wherein the anti-friction coating has a first and second surface and the concentration of the at least one additive increases from the first surface in the direction towards the second surface.

15. The bearing element as claimed in claim 14, wherein the metal is selected from a group consisting of bismuth, lithium, cadmium, indium, lead, tellerium, tin, zinc and mixtures thereof.

16. The bearing element as claimed in claim 14, wherein the alloy is selected from a group consisting of base alloys containing gallium, indium, cadmium, antimony, zinc, aluminium, magnesium, copper, silver, bismuth, tin, lead, and mixtures thereof.

17. The bearing element as claimed in claim 14, wherein the at least one additive is a powder.

18. The bearing element as claimed in claim 14, wherein the anti-friction varnish has a coating thickness and the additive has an average grain size at which 95% of the particles has a value of at least 0.1% and at maximum 5% of the particles has a value of at maximum 95% of the anti-friction varnish coating thickness.

19. The bearing element as claimed in claim 14, wherein the amount of the at least one additive is selected from a region with a lower limit of 2% by weight and an upper limit of 75% by weight relating to the dry weight of the anti-friction lacquer.

20. The bearing element as claimed in claim 14, wherein the at least one additive is immiscible with the matrix.

* * * * *